US007947920B2

(12) United States Patent
Van Borkulo et al.

(10) Patent No.: US 7,947,920 B2
(45) Date of Patent: May 24, 2011

(54) ARRANGEMENT AND METHOD FOR FORMING ONE OR MORE SEPARATED SCORES IN A SURFACE OF A SUBSTRATE

(75) Inventors: Jeroen Van Borkulo, Utrecht (NL); Peter Hans Chall, Molenhoek (NL)

(73) Assignee: Advanced Laser Separation International B.V., Beuningen (NL)

( * ) Notice: Subject to any disclaimer, the term of this patent is extended or adjusted under 35 U.S.C. 154(b) by 1182 days.

(21) Appl. No.: 11/554,380

(22) Filed: Oct. 30, 2006

(65) Prior Publication Data
US 2007/0099439 A1    May 3, 2007

(30) Foreign Application Priority Data

Oct. 31, 2005 (EP) .................................. 05077493

(51) Int. Cl.
*B23K 26/36* (2006.01)
*H01L 21/78* (2006.01)

(52) U.S. Cl. .......... 219/121.68; 219/121.69; 219/121.77

(58) Field of Classification Search .......... 219/121.67–121.69, 121.72, 121.76, 219/121.77; 438/463
See application file for complete search history.

(56) References Cited

U.S. PATENT DOCUMENTS

| | | | | |
|---|---|---|---|---|
| 3,853,406 A * | 12/1974 | Zanoni | ............................ | 356/640 |
| 5,024,724 A * | 6/1991 | Hirono et al. | ................... | 216/13 |
| 5,028,802 A * | 7/1991 | Webb et al. | ................... | 250/235 |
| 5,092,350 A * | 3/1992 | Arthur et al. | ................... | 131/281 |
| 5,098,190 A * | 3/1992 | Wijntjes et al. | ............... | 356/499 |
| 5,150,370 A * | 9/1992 | Furuya et al. | ................. | 372/106 |
| 5,480,396 A * | 1/1996 | Simon et al. | ...................... | 606/4 |
| 5,786,594 A * | 7/1998 | Ito et al. | ......................... | 250/236 |
| 5,798,784 A * | 8/1998 | Nonaka et al. | ................ | 347/243 |
| 5,922,224 A * | 7/1999 | Broekroelofs | ........... | 219/121.72 |
| 6,037,565 A | 3/2000 | Hackel et al. | | |
| 6,168,910 B1 * | 1/2001 | Hino et al. | ..................... | 430/328 |
| 6,365,061 B1 * | 4/2002 | Damer et al. | .................... | 216/65 |
| 6,563,083 B2 * | 5/2003 | Behr et al. | ............... | 219/121.78 |
| 6,873,412 B2 * | 3/2005 | Aberle et al. | .................. | 356/336 |
| 7,255,806 B2 * | 8/2007 | Yoshimura et al. | ............. | 216/65 |
| 7,364,907 B2 * | 4/2008 | Weselak et al. | .................. | 436/43 |
| 7,425,703 B2 * | 9/2008 | Nakasuji et al. | .............. | 250/310 |
| 2003/0189777 A1 * | 10/2003 | Iwasaki | ........................... | 360/25 |
| 2005/0161436 A1 | 7/2005 | Yoshimura et al. | | |

FOREIGN PATENT DOCUMENTS

EP    1 550 528 A1    7/2005
* cited by examiner

*Primary Examiner* — Samuel M Heinrich
(74) *Attorney, Agent, or Firm* — Oblon, Spivak, McClelland, Maier & Neustadt, L.L.P.

(57) ABSTRACT

The present invention is directed to an arrangement for forming one or more separated scores in a surface of a substrate. The arrangement comprises a laser for providing a laser beam, optical guiding means for guiding said laser beam to said surface of said substrate, means for moving said substrate relative to said laser beam in at least one cutting direction for forming said scores, and primary splitting means for splitting said laser beam into a plurality of primary cutting beams for forming said scores parallel to each other. Said primary splitting means are arranged for moving said primary cutting beams relative to each other for adjusting the separation between said parallel scores. The invention is further related to a method for forming one or more separated scores in a surface of a substrate.

15 Claims, 3 Drawing Sheets

ARRANGEMENT AND METHOD FOR FORMING ONE OR MORE SEPARATED SCORES IN A SURFACE OF A SUBSTRATE

FIELD OF THE INVENTION

The present invention relates to an arrangement for forming one or more separated scores in a surface of a substrate, said arrangement comprising a laser for providing a laser beam, optical guiding means for guiding said laser beam to said surface of said substrate, and means for moving said substrate relative to said laser beam in at least one cutting direction for forming said scores.

The present invention further relates to a method of forming one or more separated parallel scores in a surface of a substrate comprising the steps of: providing a laser beam using a laser; guiding said laser beam to said surface of said substrate; and moving said substrate relative to said laser beam in at least one cutting direction for forming said scores.

BACKGROUND OF THE INVENTION

In the semiconductor industry, the dicing of wafers for separating semiconductor elements is often performed using laser dicing methods. In a laser dicing method, a laser is used to form scores on the surface of the wafer enabling separation of the semiconductors which are present on the wafer.

On the wafers the semiconductor elements are formed separated by cutting lanes, wherein the semiconductor elements are often arranged in a matrix configuration. Separating the individual semiconductor elements from the wafer is performed by forming scores in these cutting lanes, in between each of the semiconductor elements. In a matrix configuration, a plurality of parallel scores has to be formed in two different directions in order to separate the semiconductor elements from the wafer.

As will be understood, a continuous effort is made in the semiconductor industry to form as many as possible semiconductor elements on a single wafer. This will make the production process more efficient, and thereby reduce the production costs. The dimensions of the cutting lanes form an important parameter determining the amount of semiconductor elements that can be formed on a single wafer. Ideally, the cutting lanes should be as narrow as possible in order to optimize the portion of the surface of the wafer available for forming semiconductor elements.

The cutting lanes present on the wafer are broader than the scores to be formed in order to form a buffer that may compensate for inaccuracies of the dicing method. These inaccuracies may be caused, for example, by inaccurate placement of the wafer relative to the laser beam, such that the score is formed not exactly where it was intended to be formed. Small variations in the placement of the substrate relative to the laser beam is compensated by the cutting allowing for such inaccuracies. However, as mentioned above, the disadvantage of broad cutting lanes is that a smaller portion of the wafer surface is available for forming semiconductor elements.

As will be understood, the laser dicing method should be as efficient as possible in order to increase the through put of wafers to be cut using the dicing method. This may for instance be achieved by using a plurality of laser beams such that a number of scores can be formed simultaneously by the plurality of beams. Ideally, each of the laser beams used for cutting the wafer has similar properties e.g. (with respect to intensity, intensity profile and pulse rate), such that the simultaneously formed scores have similar properties with respect to depths, broadness, thermal side effects etc. This is not straight forward, since the properties of each laser beam used are largely determined by its laser source and the optical system used to guide the beam to a surface.

SUMMARY OF THE INVENTION

It is an object of the present invention to provide an arrangement and method for cutting a substrate with a laser beam, alleviating the problems and disadvantages described above, and enabling quick and accurate cutting of substrates.

This object is achieved by a first aspect of the present invention, wherein there is provided an arrangement for forming one or more separated scores in a surface of a substrate, said arrangement comprising a laser for providing a laser beam, optical guiding means for guiding said laser beam to said surface of said substrate, means for moving said substrate relative to said laser beam in at least one cutting direction for forming said scores, and primary splitting means for splitting said laser beam into a plurality of primary cutting beams for forming said scores parallel to each other, wherein said primary splitting means are arranged for moving said primary cutting beams relative to each other for adjusting the separation between said parallel scores.

The advantage of splitting a single laser beam into a plurality of primary cutting beams for forming the scores, is that it enables the use of a plurality of primary cutting beams which are mutually synchronised and have a same pulse rate (since these beams all origin from a single laser beam). It also enables the forming of primary cutting beams which have the same beam intensity profile and energy upon impact on the substrate. The properties of the primary cutting beams may easily be controlled by controlling the properties of the original laser beam provided by the laser source.

Where multiple primary beams are used to form a plurality of parallel scores, it is a challenge to adapt the distance or separation between the scores to be formed simultaneously. This challenge is even enhanced by the preference of being able to maintain the properties of the primary cutting beams unamended whilst adjusting this distance. As recognised by the inventors, the optical path length traveled by the light of each of the primary cutting beams from the laser source to the surface of the substrate should be invariant during adjustment. This might be achieved by replacing the splitting means used for splitting the laser beam into primary cutting beams, however that would slow down the process substantially, and would render the dicing method prone to errors.

It is noted that by using in accordance with the invention primary splitting means which are arranged for moving the primary cutting beams relative to each other, it becomes possible to adjust the distance or separation between the parallel scores, without making amendments to the optical path length or any of the other properties of the primary cutting beams formed using the splitting means. Therefore, the distance between the scores to be formed on the surface of the substrate (e.g. a wafer) can be adjusted quickly and accurately during the dicing method, without having to replace any elements of the arrangement; and without having to readjust the beam properties. In other words, the major benefit of the invention, is that it enables the forming of parallel scores simultaneously, with a variable pitch.

According to a preferred embodiment of the invention, the arrangement comprises means for rotating the primary splitting means for adjusting the separation between the parallel scores. Rotation of the primary splitting means can be performed very accurately using mechanical means, and can be easily implemented as will be understood by the skilled person.

In another preferred embodiment based on the above-mentioned embodiment, said means for rotating said primary splitting means are arranged for rotating said splitting means about an optical axis thereof, for adjusting the separation of the parallel scores. Note that if the substrate is moved relative to the laser beam in a specific cutting direction, and the primary splitting means are rotated about an optical axis, the distance between the primary cutting beams relative to each other is not adjusted, while the distance between the scores formed on the surface will be adjusted. In particular the optical path length of the laser beams will remain the same before and after the rotation of the primary splitting means.

According to another embodiment of the present invention, said arrangement further comprises secondary splitting means for splitting at least one of said primary cutting beams into a plurality of secondary beams, wherein said secondary beams are adjacent to each other in said cutting direction. By separating the primary cutting beams into a plurality of secondary beams, the cutting process can be performed gradually by passing each of the adjacent secondary beams subsequently over the score formed by the first of said secondary beams. Cutting of a substrate may be achieved with a single path of the laser beam relative to the substrate. If each of the primary cutting beams are separated into a plurality of secondary beams, a number of parallel scores can be formed very quickly in a single path of the laser beam relative to the substrate.

According to another embodiment of the invention, the means for rotating said primary splitting means are arranged for rotating the primary splitting means relative to the secondary splitting means for adjusting the separation of said parallel scores. Note that by rotating the primary splitting means relative to the secondary splitting means, the distance of the parallel scores can be adjusted whilst maintaining the alignment of the adjacent secondary beams in the cutting direction. Moreover, the distance or separation between the one or more parallel scores to be formed can be adjusted independently from the alignment of the secondary beams.

In the arrangement, the means for moving the substrate relative to the laser beam may be arranged for moving the substrate in at least one further cutting direction. As discussed above, e.g. for a matrix configuration of semiconductor elements on a wafer, it may be beneficial to be able to form a plurality of scores in different directions on the surface of the substrate. This is not only limited to a matrix configuration, i.e. horizontal and vertical scores, but may be performed in order to be able to form any pattern of scores in different directions.

According to an embodiment of the invention, said arrangement further comprises direction rotating means for rotating said secondary splitting means relative to said substrate for arranging said secondary beams such that said secondary beams are adjacent in said further cutting direction. It is noted that by rotating said secondary splitting means, it becomes possible to change the alignment between the adjacent secondary beams such that the secondary beams are aligned in the further cutting direction. In combination with the embodiment described above, this enables quick and easy changing of the cutting direction, independent from the position of the primary cutting beams relative to each other. It therefore enables the independence adjustment of both the cutting direction, and the distance between the scores to be formed by the arrangement, such that the process can be easily automated.

Said direction rotating means may be arranged for rotating the substrate or alternatively the direction rotating means may be arranged for rotating the secondary splitting means.

The primary splitting means or the secondary splitting means of the arrangement may comprise at least one element of a group comprising a diffractive optical element, a dove prism, a semitransparent mirror, an optical cube or plate or an acousto-optical oscillator. In particular it is noted that dove prisms enable quick and accurate rotation of the primary cutting beams relative to each other. Using dove prisms as primary or secondary splitting means, enables splitting the beams with minimal losses and maximum efficiency. Diffractive optical elements are in particular useful with respect to the properties of the primary and secondary beams relative to each other. The intensity of all separated beams using a diffractive optical element is equal, as are the angles between adjacently formed beams.

According to a second aspect of the invention, there is provided a method of forming one or more separated parallel scores in a surface of a substrate, comprising the steps of: providing a laser beam using a laser; guiding said laser beam to said surface of said substrate; splitting said laser beam into a plurality of primary cutting beams; moving said substrate relative to said laser beam in at least one cutting direction for forming said scores; and prior to moving said substrate relative to said laser beam, moving said primary cutting beams relative to each other for adjusting the separation between said scores.

The invention will now further be elucidated by a description of some specific embodiments with reference to the enclosed drawings. The embodiment described are not intended to limit the scope of the invention, but are merely included for illustrative purposes only. The scope of the invention is determined by the appended claims.

DETAILED DESCRIPTION OF THE DRAWINGS

Figure 1:
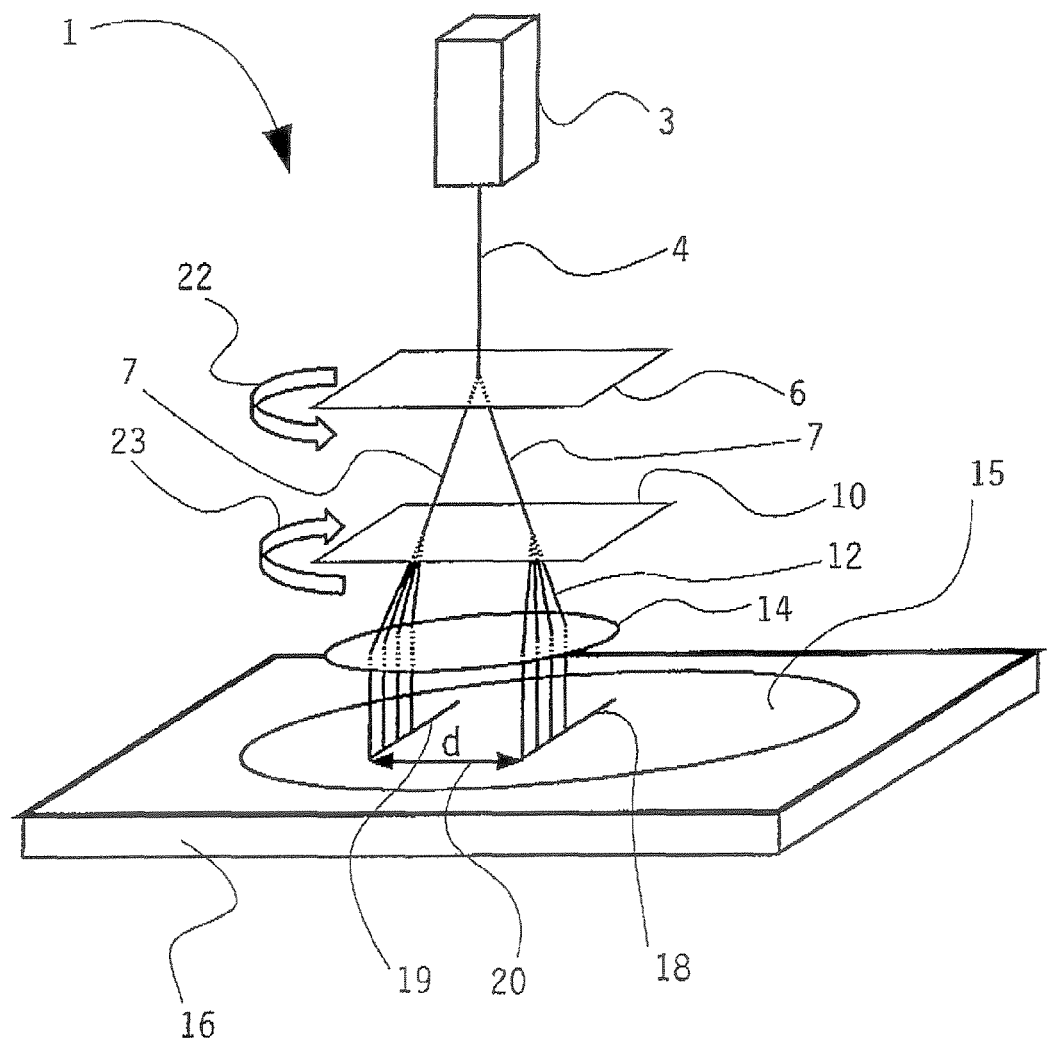
FIG. 1 illustrates an embodiment of an arrangement according to the present invention.

FIG. 1 schematically illustrates in perspective view an arrangement according to the present invention. The arrangement 1 comprises a laser 3 providing a laser beam 4. The laser beam 4 is incident on a diffractive optical element 6 which splits the laser beam 4 into two primary cutting beams 7.

The primary cutting beams 7 are incident on a further diffractive optical element 10, forming for each of the primary cutting beams a plurality of secondary beams such as secondary beam 12. The plurality of secondary beams (such as beam 12) are separated adjacent to each other aligned with a cutting direction (as explained below), for each of the primary cutting beams 7. The secondary beams are incident on an optical element 14 such as a lens for focussing the secondary beams such that all the secondary beams 12 are parallel and perpendicularly incident on the surface of a substrate 15.

The substrate 15 may be a wafer, or any other substrate which is suitable for cutting a laser cutting method. It is noted that FIG. 1 is a schematic drawing, and the dimensions of each of the elements of the arrangement are not illustrated in proportion to the other elements.

Substrate 15 is supported by supporting means 16 which are moveable (not shown) relative to laser beam 4 and in directions perpendicular thereto. Movement of substrate support 16 in a direction aligned with the plurality of secondary beams 12, will create two scores on the surface on the substrate indicated by reference numbers 18 and 19 respectively. The distance d between scores 18 and 19 is indicated by double arrow 20. It will be understood that any number of scores may be formed simultaneously, dependent on the number of primary cutting beams. In addition, multiple primary cutting beams may follow each other in a single trail to form one deep score.

Given the present cutting direction, rotation of diffractive optical element 6 as indicated schematically by arrow 22 about its optical axis will cause primary cutting beams 7 to rotate similarly relative to said optical axis of said diffractive optical element 6. In principle, the orientation between each of the primary cutting beams 7 relative to the diffractive optical element 6 will be invariant as long as laser beam 4 is kept perpendicularly incident on diffractive optical element 6. Therefore by rotating diffractive optical element within the plane perpendicular to laser beam 4, primary cutting beams 7 are rotated correspondingly about said optical axis. (Note that the optical axis which is not shown in FIG. 1, is parallel to laser beam 4, perpendicular to the diffractive optical element 6).

Given the cutting direction, by rotation of primary cutting beams 7 about the optical axis of diffractive optical element 6, will cause the scores 18 and 19 to be formed closer to each other, i.e. the distance d between scores 18 and 19 will be smaller. This will be explained hereinbelow with reference to FIGS. 2 and 3. It is further noted that rotation of diffractive optical element 6 within the plane perpendicular to laser beam 4, will have no effect on the optical path length of the laser light travelling from laser 3 to the surface of substrate 15.

Second diffractive optical element 10 may additionally be rotated about its optical axis in a plane perpendicular to laser beam 4, in order to change the alignment of secondary beams 12. In particular, the alignment of secondary beams 12 may be adjusted to a further cutting direction if desired. According to a method of the present invention, a plurality of scores, such as scores 18 and 19, may be formed on the surface of substrate 15 in a first direction. After forming said scores in the first direction, the second diffractive optical element 10 is rotated about its optical axis in order to adjust the alignment of secondary beams 12 to a second cutting direction (not shown). Optionally, first diffractive optical element may subsequently be rotated about its optical axis in order to adjust the distance between the scores to be formed in the second direction. Subsequently, support means 16 may be moved relative to laser beam 4 in said second direction, in order to form the scores on the surface of the substrate 15 in this second direction. The above will provide a straightforward and efficient method of dicing for example a wafer of semiconductor material for separating individual semiconductor elements which may be arranged in a matrix configuration.

Figure 2:
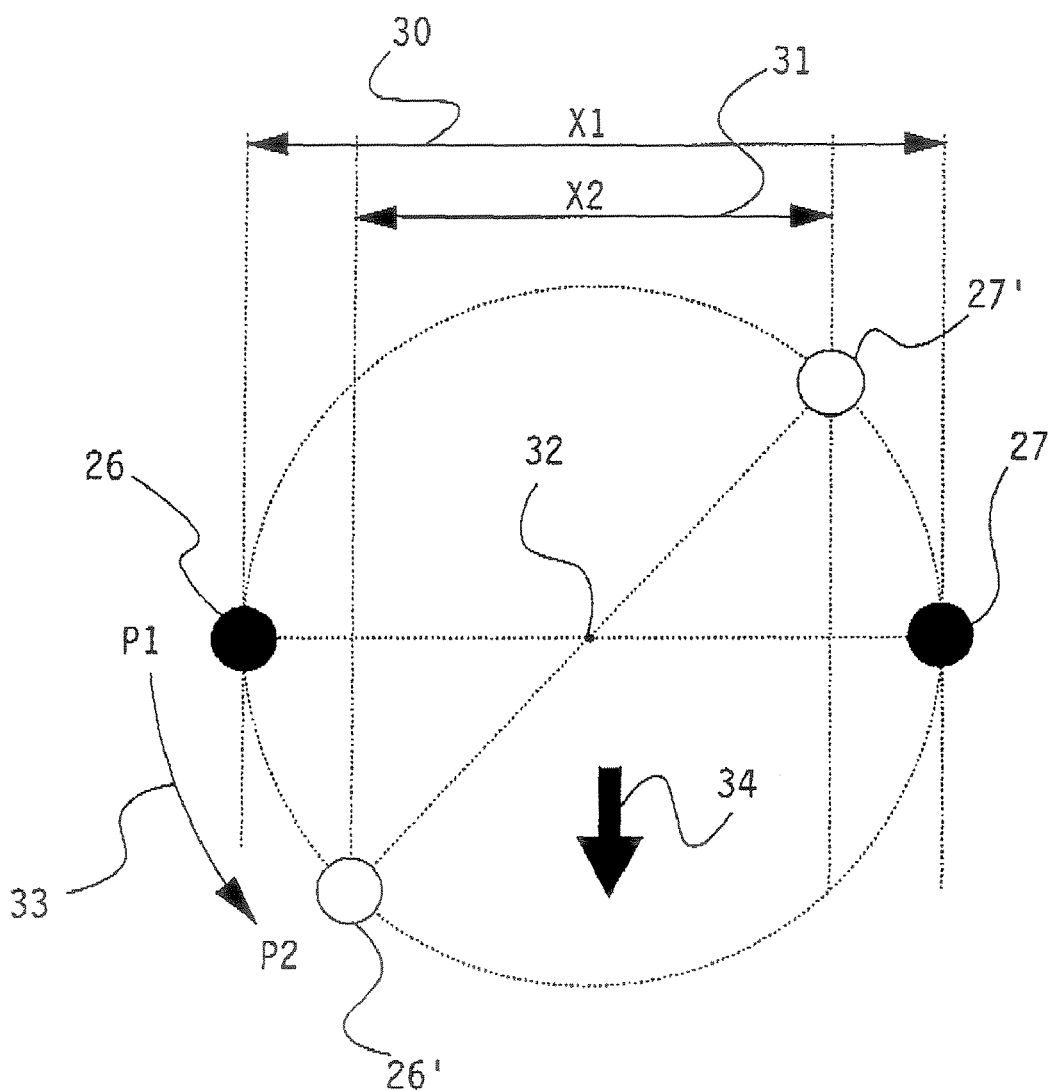
FIG. 2 schematically illustrates the principle of operation on which the present invention is based.

The principle of operation of the present invention is illustrated in FIG. 2. Schematically FIG. 2 illustrates a projection of two impact spots (26 and 27) formed by two primary cutting beams on the surface of a substrate. Note that the primary cutting beams have not been splitted into a plurality of secondary beams, spots 26 and 27 are a direct projection of the primary cutting beams on the surface of a substrate. The spots 26 and 27 are aligned in a first direction schematically indicated by P1. The cutting direction is schematically indicated by arrow 34.

The distance between the score formed by spot 26 and 27 in the cutting direction 34, is indicated schematically by X1 (double arrow 30). Suppose the alignment of spots 26 and 27 is adjusted by rotating a diffractive optical element to a second position, the new alignment being indicated schematically by P2 and the direction of the rotation schematically indicated by arrow 33. The spots of the laser beams formed after the adjustment of the alignment are indicated by 26' and 27'.

If the substrate is moved relative to the laser beam in cutting direction 34, it is noted that the distance between the scores formed on a substrate surface, which is schematically indicated by X2 (double arrow 31) is smaller than before the adjustment (as indicated by X1 (double arrow 30)). The distance between the scores to be formed may therefore easily be adjusted by rotating the diffractive optical element forming the primary cutting beams, whereby the axis of rotation is parallel to the optical axis of the diffractive optical element.

Figure 3:
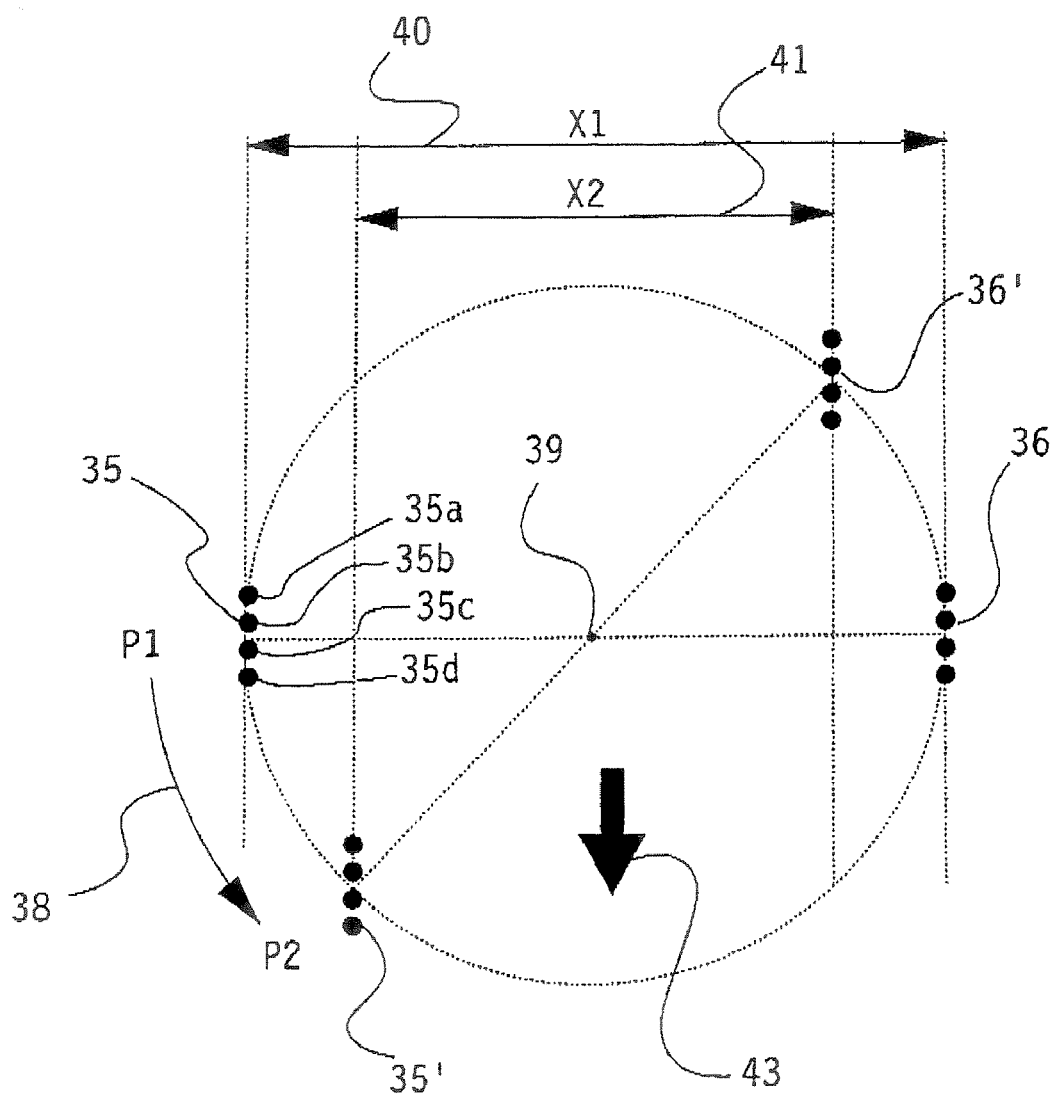
FIG. 3 illustrates the same principle as is illustrated in FIG. 2, but for a different embodiment of the invention.

FIG. 3 schematically illustrates the operation of a further embodiment of the present invention. In this embodiment, a laser beam passes a primary splitting means for forming a plurality of primary cutting beams, and a secondary splitting means for separating each of the primary cutting beams into a plurality of secondary beams. FIG. 3 illustrates schematically the spots formed on the surface of a substrate by each of the secondary beams.

In FIG. 3, spots 35$a$, 35$b$, 35$c$ and 35$d$ indicate four spots corresponding to four different secondary beams achieved by splitting a first primary cutting beam. The group of spots 35$a$-35$d$ is schematically indicated by reference number 35. Correspondingly, the group of four spots 36 indicate four impact spots of secondary beams achieved by splitting a second primary cutting beam. In facts, FIG. 3 is similar to FIG. 2, however instead of spots 26 and 27 in FIG. 2 indicating the impact spots of the primary cutting beams directly on the surface of the substrate, in FIG. 3 these primary beams are further separated into a plurality of secondary beams, the impact spots of which are grouped together as in a group 35 and 36.

The cutting direction presently followed by the arrangement of this embodiment is schematically indicated by arrow 43. Each of the spots in group 35 and 36 travel relative to the surface of the substrate in the direction indicated in arrow 43, leaving a score of a desired depth in their trail.

Group 35 of impact spots 35$a$-35$d$ and group 36 indicate a first position, schematically denoted by P1, wherein the scores formed by groups 35 and 36 are separated by distance X1 (double arrow 40). If only the primary splitting means, forming the primary cutting beams are rotated as indicated by arrow 38, leaving the secondary splitting means fixed in its place, the primary splitting beams are rotated about an axis of rotation schematically indicated by 39 without changing the alignment of the secondary beams of each of the groups 35 and 36 relative to each other. In a second position, groups 35 and 36 are respectively indicated by 35' and 36' (this position is denoted by P2). Using the same cutting direction as indicated by arrow 43, the scores formed by groups 35' and 36' are separated by a distance X2, schematically indicated by double arrow 41. The optical path length measured from the laser forming the laser beam to the impact points of each of the secondary beams remained unamended by the changed position of the primary splitting means. This provides the advantage that the optical properties of the beams at their respective impact spots remain unamended as well.

As clearly indicated by FIGS. 2 and 3, the arrangement and method of the present invention provide an ideal manner for adjusting the distance between the scores to be formed by the plurality of primary cutting beams, without effecting optical beam properties at the point of impact, and without effecting the alignment of any secondary beams formed by the arrangement. This advantage is achieved by the ability to move the primary cutting beams formed by a primary splitting means relative to each other e.g. by rotation about an axis of rotation parallel to an optical axis of the arrangement. In addition, by using multiple splitting means which can be rotated independent from each other, it becomes possible to amend the alignment of the secondary beams independently of the position of the primary beams, and vice versa. The present invention therefore enables a fast adjustment of the 'inter score' distance, and of the direction of the scores to be formed, which can be easily automated in an arrangement and which enables accurate operation.

The method of the present invention enables adjustment of the distance between the scores over large range, dependent on specific design choices and application. In particular, for example, for wafer dicing methods that use specialized optical splitting means, such as diffractive optical elements, an adjustment of the distance between the scores formed by a plurality of primary cutting beams, is possible over a range of for example 0 µm to 15 mm, with a typical accuracy of 0.5 µm. The efficiency of the process enables application thereof for bulk manufacturing processes, however, the accuracy and flexibility also enable highly specialized dicing techniques in multiple directions. It will be understood that application of the invention is particularly useful within the semi-conductor industry.

For the purpose of comprehensiveness, it is noted here that numerous modifications and variations of the present invention are possible in the light of the above teachings. It is therefore understood that, within the scope of the appended claims, the invention may be practise otherwise than as specifically description herein,

The invention claimed is:

1. An apparatus for forming one or more separated scores in a surface of a substrate, said apparatus comprising:
   a laser providing a laser beam;
   optical guiding means for guiding said laser beam to said surface of said substrate;
   means for moving said substrate relative to said laser beam in at least one cutting direction to form said scores parallel to one another;
   primary splitting means for splitting said laser beam into a plurality of primary cutting beams;
   secondary splitting means for splitting at least one of said primary cutting beams into secondary beams, said secondary beams split from each primary cutting beam being separated adjacent to each other and aligned with a cutting direction of one score; and
   means for rotating said primary splitting means, said means for rotating configured to rotate said primary splitting means relative to said secondary splitting means to adjust a separation between said parallel scores.

2. The apparatus according to claim 1, wherein said means for rotating are configured to rotate said primary splitting means about an optical axis of said primary splitting means to adjust said separation between said parallel scores.

3. The apparatus according to claim 1, wherein said primary splitting means or said secondary splitting means includes at least one of the following elements: a diffractive optical element, a dove prism, a semitransparent mirror, an optical cube or plate, and an acousto-optical oscillator.

4. The apparatus according to claim 1, wherein said means for rotating keeps an optical path length traveled by said laser beam invariant during rotation of said primary splitting means.

5. The apparatus according to claim 1, wherein said means for rotating adjusts said separation between said parallel scores while maintaining alignment of said secondary beams split from each primary cutting beam with said cutting direction of one score.

6. The apparatus according to claims 1, 2, 4, or 5, further comprising:
   direction rotation means for rotating said secondary splitting means relative to said substrate so that said secondary beams are aligned with a further cutting direction.

7. The apparatus according to claim 6 further comprising:
   supporting means for supporting said substrate, and
   wherein said direction rotation means are configured to further rotate said substrate.

8. A method of forming one or more separated scores in a surface of a substrate, comprising:
   providing a laser beam;
   guiding said laser beam to said surface of said substrate;
   splitting said laser beam into a plurality of primary cutting beams;
   splitting at least one of said primary cutting beams into secondary beams, said secondary beams split from each primary cutting beam being separated adjacent to each other and aligned with a cutting direction of one score;
   moving said substrate relative to said laser beam in at least one cutting direction to form said scores parallel to one another; and
   prior to moving said substrate relative to said laser beam, rotating said primary cutting beams to adjust a separation between said parallel scores.

9. The method according to claim 8, wherein said splitting said laser beam into said plurality of primary cutting beams is performed using primary splitting means, and wherein said rotating said primary cutting beams includes rotating said primary splitting means.

10. The method according to claim 9, wherein said rotating includes rotating said primary splitting means around an optical axis of said primary splitting means.

11. The method according to claim 10, wherein said splitting at least one of said primary cutting beams is performed using secondary splitting means.

12. The method according to claim 11, wherein said rotating said primary splitting means is performed relative to said secondary splitting means.

13. The method according to claim 8, further comprising:
   rotating said secondary beams such that said secondary beams are aligned with a further cutting direction.

14. The method according to claim 8, 9, or 10, wherein said rotating said primary cutting beams includes keeping an optical path length traveled by said laser beam invariant.

15. The method according to claim 8, wherein said rotating said primary cutting beams to adjust said separation between said parallel scores includes maintaining alignment of said secondary beams split from each primary cutting beam with said cutting direction of one score.

* * * * *